United States Patent Office 3,161,989
Patented Dec. 22, 1964

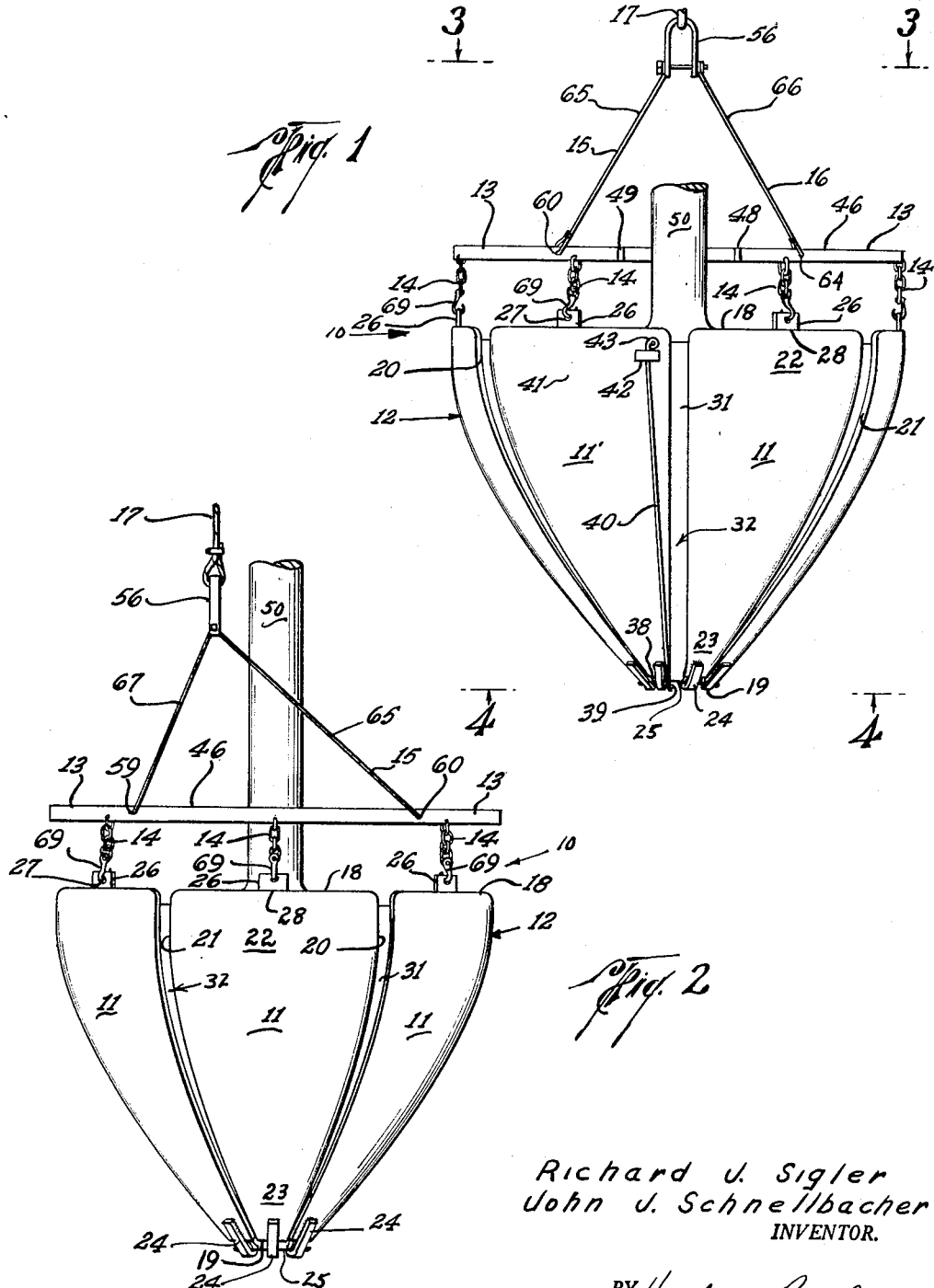

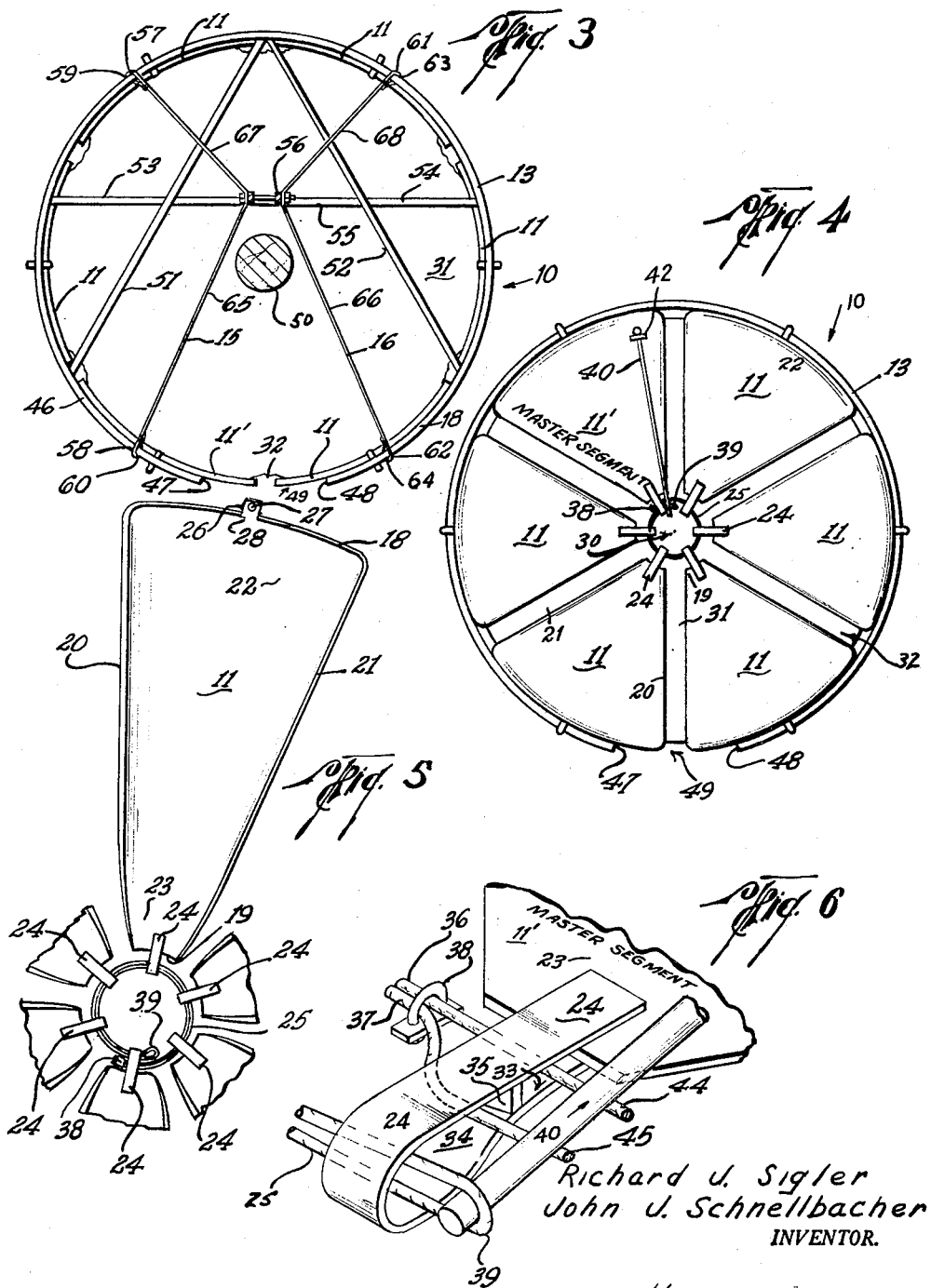

3,161,989
APPARATUS FOR MOVING TREES, EARTH OR OTHER OBJECTS
Richard J. Sigler and John J. Schnellbacher, Houston, Tex., assignors, by mesne assignments, to Green Shade Enterprises, Inc., a corporation of Texas
Filed Aug. 13, 1959, Ser. No. 833,565
3 Claims. (Cl. 47—37)

The device of the present invention relates to a new and improved apparatus for moving trees, earth or other objects, particularly trees of relatively large size, and sections of earth in conjunction therewith.

An object of the present invention is to provide a new and improved container formed of several segments connected or held together by a suitable means, which segments may be quickly and easily disconnected or detached from each other whereby the segments may be removed from a hole in the earth without disturbing the contents of the container or requiring additional digging.

Another object of the present invention is to provide a plurality of segments which may be quickly and easily connected together to approximately form a cone for receiving trees, earth or other objects therein.

Still another object of the present invention is to provide a new and improved container for supporting objects therein consisting of a plurality of segments detachably assembled together thereby approximately forming a partial sphere.

A further object of the present invention is to provide an apparatus for moving trees, earth and other objects which may be operated or handled by a standard boom of sufficient capacity to handle such apparatus when filled.

A still further object of the present invention is to provide an apparatus for moving or transplanting trees wherein the necessity of grasping or lifting the tree by its trunk is eliminated.

A further object of the present invention is to provide a new and improved apparatus for moving or transplanting trees which obviates the necessity of balling and burlapping of the tree or trees to be moved.

In copending application, Serial No. 780,012, filed December 12, 1958, now abandoned, an excavation and tree digging machine is provided which is suitable for cutting a section of earth below a tree trunk in which the roots of the tree extend, and then raises the tree roots and section of earth out of the ground. Application Serial No. 780,012 has been abandoned and was superseded by a continuation-in-part application Serial No. 352, filed January 4, 1960, now patent number 3,017,707.

An object of the present invention is to provide a new and improved apparatus for moving trees, sections of earth and other objects for use in conjunction with the apparatus of said copending application, Serial No. 780,012, filed December 12, 1958, now abandoned.

Another object of the present invention is to provide a new and improved apparatus for moving trees including a container comprising a plurality of segments releasably connected together and which are flexibly supported from a rigid member.

The construction designed to carry out the invention will be hereinafter described, together with other features thereof.

The invention will be more readily understood from a reading of the following specification and by reference to the accompanying drawings forming a part thereof, wherein an example of the invention is shown, and wherein:

FIG. 1 is a side elevation of the apparatus of the present invention assembled and containing a tree;

FIG. 2 is a side elevation of the apparatus of the present invention illustrating FIG. 1 turned 90° to the right;

FIG. 3 is a view taken along line 3—3 of FIG. 1;

FIG. 4 is a view taken along line 4—4 of FIG. 1;

FIG. 5 is a plan view illustrating a single segment of the container and a slightly enlarged view of the means joining the segments together; and FIG. 6 is a detailed isometric view illustrating the means for locking the segments of the container together.

In the drawings the apparatus of the present invention is generally designated at 10. The apparatus 10 is comprised of a plurality of segments 11 which form a container 12. Each of the segments 11 is attached to or suspended from a support member or partial ring 13 by means of a plurality of chains or flexible members 14. The partial ring 13 and container 12 supported therefrom are in turn supported by cables 15 and 16 or other suitable means which in use may be attached to any standard boom, a portion of which is shown at 17 (FIGS. 1 and 2), or any similar support apparatus.

The container 12 is illustrated in the drawings, FIGS. 1-4, as being formed from six segments 11 and conforming approximately to the general shape of a cone or a hemisphere. Although a container 12 having six segments 11 is illustrated as being a specific embodiment of the apparatus 10 of the present invention, more or less segments 11 could be used.

It is preferable that each of the segments 11 be of a similar size and shape for ease in manufacturing and handling. Preferably, each segment 11 is curved inwardly from its top edge 18 to its lower edge 19 and is also curved or arcuately shaped from its longitudinal sides 20 and 21 (FIGS. 1, 2 and 5). The top edge 18 of each segment 11 is relatively longer than its lower edge 19. Thus the upper portion 22 of each segment 11 is wider than its lower portion 23.

Each of the segments 11 has a loop or strap 24 attached to its lower end portion 23 which is adapted to receive a cable 25 or other suitable flexible member, the purpose of which will be hereinafter described. A strap or bar 26 having an eye or ring 27 therein, is attached to the upper center portion 28 of the segment 11 by welding or other suitable means. The segment 11 can be made of one continuous member or of several sections connected together, as desired. The actual shape and curvature of the segments 11 can also vary; for example, each of the segments 11 may even be flat or substantially flat. It is desirous however, that the segments 11 when assembled together to form the container 12 fit relatively close together at their lower end portions 23 so as to leave a small opening 30, (see FIG. 4) such opening being sufficiently small to inhibit trees, earth or other objects positioned in the container 12 from falling therefrom.

The diameter at the top of the container 12 should be sufficiently wide to receive a section of earth 31 or other objects of the size desired to be positioned in such container 12. Also, it is desirable to provide between adjacent segments 11 a longitudinal space 32 which should be sufficiently small to inhibit the falling of earth and other objects from the container 12 formed thereby. The width of each of such spaces 32 is preferably of about the width of the cutter blades which form a part of the apparatus disclosed in said patent application Serial No. 780,012, now abandoned.

As the container 12 is particularly adapted for receiving a section of earth 31 around the roots of relatively large trees, i.e. trees having a diameter of from approximately 3 to 10 inches, the segments 11 and the other parts therewith should be made of material such as steel which is sufficiently strong to withstand such relatively large or heavy weights.

When the container 12 is assembled, the segments 11 are joined together at their lower end portions 23 by a double cable 25 or other suitable flexible member extended through each of the loops 24 of the segments 11 which serves to draw the end portions 23 of the segments 11 close together, but preferably without overlapping each other to form the opening 30.

In the preferred form of the invention, the cable 25 is a double cable and is connected to one of the segments 11 as illustrated in FIG. 6. The loop 24 is divided into two sections, an upper section 33 and a lower section 34, by a small bar or spacing member 35 which is welded or otherwise secured thereto. A single length of cable is looped or doubled over to form the double cable 25 having two bitter ends 36 and 37. One end 36 of the cable 25 is extended through the upper section or space 33 of the loop 24 and the other end 37 of the cable 25 is extended through the lower section or space 34 of the loop 24. The two ends 36 and 37 are then securely fastened to each other by means of a U-clamp 38 or other suitable means. The loop or bight end 39 of the cable 25 is inserted through each of the loops 24 of the segments 11 forming the container 12. Should the loop 24 of the remaining segments contain a spacer bar 35, then the double end cable 25 would be inserted through the lower end portion or section 34 of the loop 24 on each of the segments 11. FIG. 5 best illustrates a position of the cable 25 in the loops 24. In order to use the cable, minimum length of the cable 25 is of such length that when all of the segments 11 are assembled or joined together, and the opening 30 is sufficiently small as desired, the bight or loop end 39 of the cable 25 extends through the lower section or space 34 of the loop 24 through which the end portions 36 and 37 are attached (see FIG. 5 and FIG. 6).

A rod or pin 40 is attached to one of the segments 11, which is the master segment and is designated 11' for illustrative purposes. The rod 40 extends substantially the length of the segment 11' and conforms to the outer surface of the segment 11' and is slidably mounted on the segment 11' on the upper portion 41 by means of a bracket 42 or other suitable means through which the rod or pin 40 extends. The rod 40 can freely travel through the strap 42, until the upper end portion 43, which is enlarged sufficiently to prevent the rod 40 from traveling downward beyond the bracket 42, is reached. This master segment 11' is the segment below which the loop or bight end 39 of the cable 25 is positioned. The rod or pin 40 is inserted through the loop 39 of the cable 25 thereby locking the segments together at their lower ends. In positioning the rod 40 in the cable loop 39 of the cable 25, the rod 40 should extend on the outboard side of the cable portions 44 and 45 as shown in FIG. 6. Thist prevents the rod 40 from galling or binding with the cable 25 which might prevent the release of the rod 40 from the cable loop 39 when desired to release same.

The container 12 is completely formed when each of the upper portions 22 of the segments 11 are attached to the partial ring 13 which will be explained in detail hereinafter. The partial ring 13 illustrated in the drawings, FIGS. 1–4, is circular in shape and is comprised of a body 46 having spaced apart ends, 47 and 48 with a lateral opening or gap 49 therebetween for permitting the lateral movement of a tree 50 or other similar object through such opening or gap 49 to position same in the area bounded by the partial ring 13. Throughout the specification and the claims hereof, the term "partial ring" means an annular ring from which a portion or section has been omitted or eliminated to form a lateral opening or gap such as the gap 49, and also any other member whether annular, curved or otherwise which is rigid and which is capable of being connected to the segments 11 while providing a lateral opening or gap for permitting the movement of a tree or similar object therethrough to the area within the member.

To give the partial ring the necessary strength to enable such ring to support a relatively heavy weight, such as a tree having a diameter of from three to ten inches, bracing members 51, 52, 53, 54 and 55 (see FIG. 3) are connected by welding or other suitable means to the partial ring 13. Looking at a top plan view of the partial ring 13 as if it were the face of a clock, member 51 extends from approximately twelve o'clock to approximately eight o'clock and member 52 extends from about twelve o'clock to about four o'clock, thereby forming a V-brace. Bracing members 53, 55 and 54 are connected to the partial ring 13 on a line extending from approximately ten o'clock to approximately two o'clock, with member 53 connected between partial ring 13 and bracing member 51, member 55 connected between bracing members 51 and 52, and member 54 connected between bracing member 52 and partial ring 13. The center portion of the partial ring 13, and the area extending from the center portion to the gap 49 between the spaced apart ends 47 and 48, are free of any of such bracing which permits trees or similar objects to be laterally moved through the gap 49 to the center portion of the partial ring 13.

It can be appreciated that any desired amount or positioning of bracing may be used on the partial ring 13, and the invention is not limited to the particular bracing shown; however, the area extending from the central portion of the partial ring 13 to the spaced apart ends 47 and 48 should remain unobstructed.

As best seen in FIGS. 1, 2 and 3, the partial ring 13 is suspended from the cables 15 and 16 connected to the U-bolt 56 or similar connector means. Each of the ends 57 and 58 of the cable 15 are extended through the holes 59 and 60, respectively, in the partial ring 13, which end portions 57 and 58 after having been extended through the holes 59 and 60 are looped back and attached to the cable 15 by clamping, splicing, welding or other suitable means. Similarly, the cable 16 has ends 61 and 62 positioned and secured in holes 63 and 64, respectively. The U-bolt 56 is connected to each of the cables 15 and 16 so as to respectively divide the cables into two unequal lengths, the long portion 65 being approximately equal to the long portion 66 and the short portion 67 being approximately equal to the short portion 68 which offset the U-bolt 56 from the central portion of the ring 13 so that the central portion of the partial ring 13 is unobstructed and the area from such central portion extending to the gap 49 between the spaced apart ends 47 and 48 of the partial ring 13 is also unobstructed.

Also, the ring 13 has a plurality of short equal lengths of chain 14 and hooks 69 or other suitable means attached thereto. The chains 14 are equally spaced apart and are equal in number to the number of segments 11 comprising the container 12. The hooks 69 are adapted to be positioned through the holes 27 in the bars 26 attached to the segments 11. Other suitable means, for instance cable, lines, or similar members may be used in lieu of the chains 14 for connecting the segments 11 to the partial ring 13 without departing from the scope of the present invention. By reason of the connection of the segments 11 to the rigid ring 13 through the flexible chains 14 or other flexible members, some lateral shifting of the upper ends of the segments 11 relative to each other is possible, but the amount of such lateral shifting is limited since the partial ring 13 is rigid. Such rigidity in the ring is important because it prevents the upper ends of the segments 11 from collapsing towards each other when lifting and lowering a section of earth therewith. Therefore, breaking up of the section of earth and damage to any roots therewith is prevented with the construction of this invention.

For illustrative purposes, the use of the apparatus 10 of the present invention will be described as appropriate for the transplanting of trees, particularly trees of relatively large size as set forth above. Although the apparatus of the present invention may be used in various ways and with various apparatus, it is particularly suited or adapted for use in conjunction with the apparatus in copending application, Serial No. 780,012, filed December 12, 1958, now abandoned. The apparatus in said copending application is an excavation and tree digging machine and is suitable for cutting a section of earth below a tree trunk into which the roots of the tree extend and for raising such tree, roots and section of earth out of the ground. Such apparatus is also suitable for cutting a section of earth for providing a hole into which the tree may be transplanted.

Prior to positioning the container 12 in the hole formed by the cutting and removal of the section of earth, either with or without a tree therein, the segments 11 of the container 12 are attached together at their lower ends by the double cable 25 which is attached to the master segment 11' by positioning the bitter ends 36 and 37 as illustrated in FIG. 6 and as previously explained above. The bight end 39 of the cable 25 is then passed or extended through the straps 24 on the end of each segment 11, thereby connecting the segments 11 together as illustrated in FIG. 5. The rod 40 on one of the segments 11' is longitudinally moved downwardly in the bracket 42 so that its lower end passes through the loop end 39 of the cable 25, making certain that the rod 40 is positioned outwardly of the cable portions 44 and 45.

After the container 12 is thus assembled, it is placed in a hole in the ground from which a section of earth has been removed, which hole corresponds in shape to the shape of the container. The connected lower ends of the segments 11 are positioned at the bottom part of the hole. The section of earth, with or without a tree therein, is then lowered with the apparatus of said Patent Number 3,017,-707, issued January 23, 1962 or any other suitable apparatus and is positioned in the container 12 in the hole in the ground. If a tree is lowered with the section of dirt, the tree is positioned in the center of the container 12 or approximately the central portion of the container 12.

The partial ring 13 is attached to any standard boom (not shown) by means of the cables 15 and 16 and the U-bolt 56 therewith. After the section of earth has been positioned in the container 12, the partial ring 13 is moved into position with the boom to place the ring 13 over the container 12. If a tree 50 is present, the ring 13 is moved laterally with respect to the tree 50 so that the tree moves through the gap 49. Each of the segments 11 is then connected or attached to the hooks 69 on the chains 14.

The section of earth is then lifted upwardly by raising the ring 13 to lift the section of earth out of the hole in the ground for the movement of same to another location for transplanting or other purpose. When transplanting a tree, the section of earth with the tree is transported or moved to a location having a hole in the earth suitable for receiving the tree, earth and roots therein which hole has been previously prepared for receiving the section of earth. It should be specifically noted that the section of earth and the tree therewith is lifted without the necessity for grasping the trunk of the tree and therefore damage to the tree trunk is avoided.

The container 12 is then lowered into the hole until the segments 11 rest therein. Even after the segments 11 come to rest in the hole, the lowering of the ring 13 is continued until the strain on the chains 14 is released so that they become slack. The master segment 11' is then tapped or driven downwardly relative to the rod 40 which effects a release of any binding between the rod 40 and the loop 39 of the cable 25. After such release, the pin 40 is easily moved upwardly relative to the segment 11' and the loop 39 to withdraw the pin 40 from the loop 39. When the pin 40 is thus released from the loop 39, the cable 25 may then be withdrawn from all of the loops 24 except the loop 24 on the master segment 11' by lifting upwardly on the entire apparatus 10. Therefore, as the apparatus 10 is raised with the section of earth still in the container 12, the segments 11 slide upwardly out of the hole while the section of earth remains in the hole and the cable 25 slides through each of the loops 24 of the segments 11 during such upward movement. In that manner, the segments 11 are withdrawn from the hole without appreciably disturbing the section of earth therein or the tree, if any therewith. During the withdrawal of the segments 11 from the hole in the ground, the cable 25 remains attached to the segment 11' and is withdrawn from the hole therewith, so that the cable 25 is in position for subsequent reconnection and use.

Due to the fact that the segments 11 slide upwardly as they are withdrawn from the hole, there is substantially no loss of earth from the area around the section of dirt which remains in the hole after the segments 11 are withdrawn therefrom. Therefore, after the segments 11 and the rest of the apparatus 10 is removed from the hole in the ground, there is normally very little, if any, filling in or digging required to smooth out the earth around the holes.

It is to be noted that variations in the method of connecting the cable 25 to the loop 24 on segment 11' may be made without departing from the scope of the invention. For example, the U-clamp 38 on the bitter ends 36 and 37 of the cable 25 can be made sufficiently large to prevent passage of such clamp through the spaces or sections 33 and 34 or the area comprising both such spaces, should a spacer bar 35 not be used. Also the cable 25 may be continuous rather than as illustrated in the drawings.

The foregoing disclosure and description of the invention is illustrative and explanatory thereof and various changes in the size, shape and materials, as well as in the details of the illustrated construction, may be made within the scope of the appended claims without departing from the spirit of the invention.

What is claimed is:

1. An apparatus for moving trees, earth or other objects, comprising a plurality of segments adapted to be releasably connected together with a locking means to form the structure of a container, each of said segments having an upper and a lower end, a partial ring for releasably supporting and connecting together each of said upper ends of said segments, releasable locking means on said segments for locking said segments together and adapted to be released for releasing said lower ends of said segments from each other and a releasable flexible connection means between said segments and said partial ring.

2. The structure recited in claim 1, including bracing members on said partial ring for giving additional strength thereto, said bracing members being offset from the center portion of said partial ring.

3. The structure recited in claim 1, including cable suspension members on said ring for supporting said ring, said cable suspension members being offset from the center of said partial ring.

References Cited in the file of this patent

UNITED STATES PATENTS

| | | |
|---|---|---|
| 388,154 | Stanley et al. | Aug. 21, 1888 |
| 594,668 | Wilkens | Nov. 30, 1897 |
| 621,405 | Garrett | Mar. 21, 1899 |
| 674,503 | Haegg | May 21, 1901 |
| 1,139,735 | Spuhr | May 18, 1915 |
| 1,932,527 | Long | Oct. 31, 1933 |
| 2,163,386 | Sweitzer | June 20, 1939 |
| 2,338,617 | Baker | Jan. 4, 1944 |
| 2,350,611 | Hicks | June 6, 1944 |
| 2,387,457 | McIlwrick et al. | Oct. 23, 1945 |
| 2,602,000 | Richardson | July 1, 1952 |
| 2,626,828 | Morgan | Jan. 27, 1953 |
| 2,678,230 | Consoldane et al. | May 11, 1954 |
| 3,018,880 | Brugmann | Jan. 30, 1962 |